Patented June 13, 1933

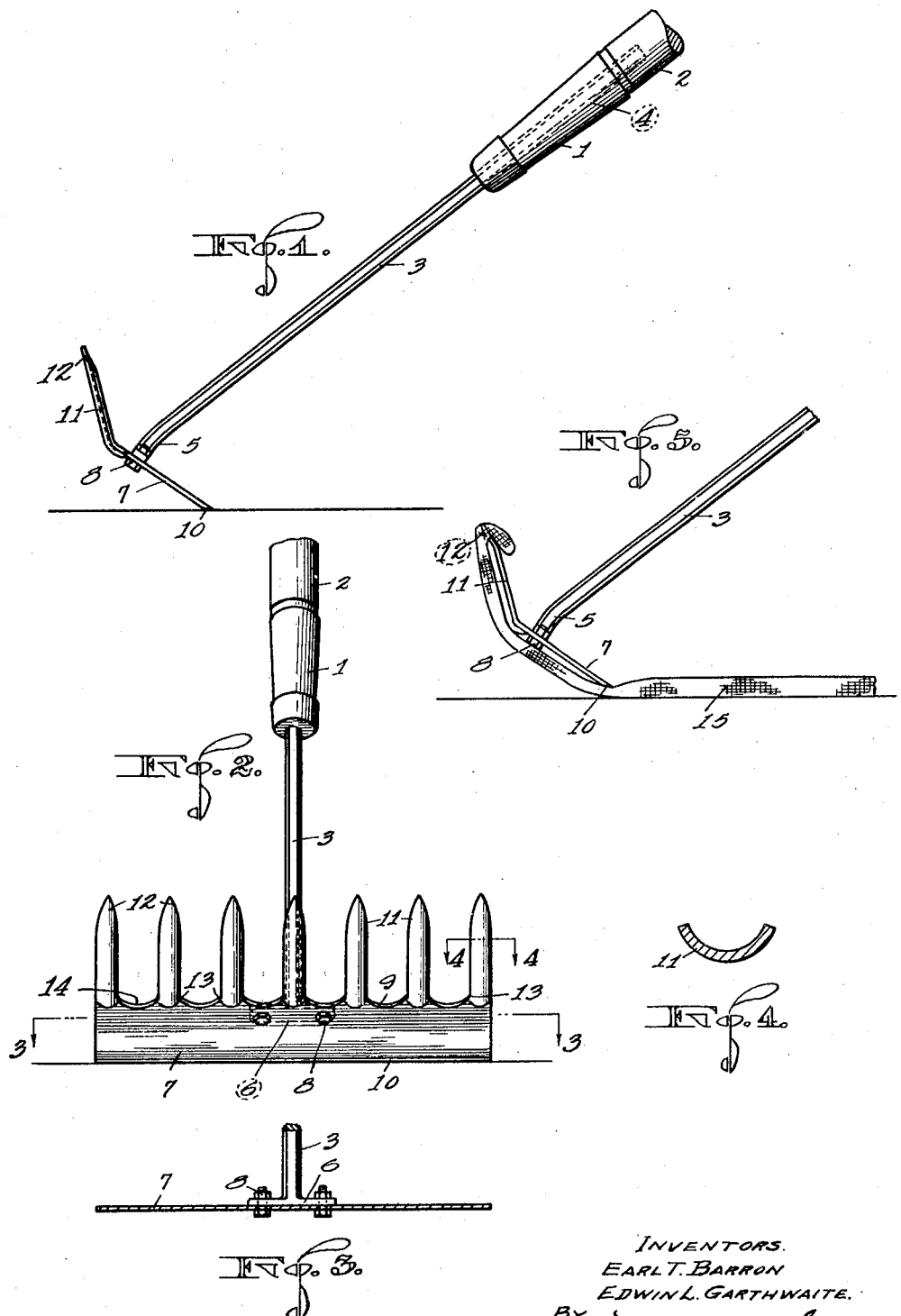

1,913,786

UNITED STATES PATENT OFFICE

EARL T. BARRON AND EDWIN L. GARTHWAITE, OF SACRAMENTO, CALIFORNIA, ASSIGNORS TO JOHN C. KORTICK, OF SAN FRANCISCO, CALIFORNIA

GARDEN TOOL

Application filed September 8, 1930. Serial No. 480,554.

The present invention relates to improvements in tools, and more particularly has reference to fire fighting tools adapted principally for clearing a strip of ground from grass and weeds and which can also have a wet rag secured thereto for mopping the edge of a fire for extinguishing the same.

It is principally proposed in the present invention to provide a fire fighting tool of the character described that combines in it various functions and may be used as a rake or as a cutter for low growth such as grass or weeds, and that furthermore allows a sack or the like to be conveniently and quickly fastened thereto so that it may be used as a mop for extinguishing a fire.

It is further proposed in the present invention to provide a fire fighting tool that is particularly fitted for the purpose, light and strong in construction, and to some extent self-cleaning.

It is further proposed in the present invention to construct a tool of the character described in which the rake section and the weed-cutting section are arranged in such a manner and at such angularity as to be particularly convenient and effective in handling. The handle is bent at a slight angle to have the tines and the blade extend at the desired angle with respect to the hand grip portion.

Further objects and advantages of our invention will appear as the specification proceeds.

The preferred form of our invention is illustrated in the accompanying drawing, in which:

Figure 1 shows our tool in side elevation, the larger portion of the handle being omitted, Figure 2 shows a front view of the tool as the same appears when used as a weed cutter, Figure 3 a section taken along line 3—3 of Figure 2, Figure 4 a section taken along line 4—4 of Figure 2, and Figure 5 a side elevation of the lower portion of the tool with a sack or the like fastened thereto for the purpose of mopping a fire.

While we have shown only the preferred form of the invention, we wish to have it understood that various changes or modifications may be made within the scope of the claims hereto attached without departing from the spirit of the invention.

In its preferred form our tool comprises a handle 1 consisting of a conventional wooden handle section 2 shown in part only, and a metal bar 3 anchored in the wooden section as at 4, and preferably made of hexagonal cross section and of considerable length. The extreme end of the bar is slightly bent as shown at 5, and terminates in a small transverse member 6 to which a rectangular elongated plate 7 is fastened by means of bolts 8. This rectangular plate is preferably fastened in such a manner that one of its long edges indicated at 9 extends only slightly beyond the handle at its outer curve, while the main section of the plate extends considerably beyond the handle at its inner curve and is formed with a cutting edge 10. The long edge 9 has a plurality of rake teeth 11 extending therefrom, these rake teeth being formed integral with the plate 7 and running at an angle thereto so that the rake teeth preferably form an angle with the main section of the handle of somewhat less than ninety degrees. The rake teeth are of considerable width and are concave as shown in Figure 4 and terminate in points 12. The rake teeth are well spaced from one another and merge into the edge 9 in curves indicated at 13, the edge 9 itself being rounded between the teeth as shown at 14.

If the tool is to be used for extinguishing a fire, particularly running along the edge of a low fire, a preferably wet sack 15 may be anchored in the teeth 11 with its closed end and guided around the outer face of the plate 7 and the cutting edge 10 so as to trail behind the tool when the latter is pushed forward for extinguishing a low burning fire.

The manner of using the tool will be readily understood from the foregoing description.

When the tool is to be used for clearing a fire line, it is held in the position shown in Figure 1 for quickly and expeditiously cutting grass and weeds or similar undergrowth from the ground surface, the cut growth being quickly pushed to the right or the left. It should be noted that the slight bend in the bar at 5 places the cutter at the right angle at which the tool may be handled to best advantage.

When the tool is to be used as a rake it is reversed, and in this connection it will again be seen that on account of the angle between the teeth and the plate which compensates for the bend 5, the teeth occupy a most advantageous angle for quick results. It should also be noted that the two angles in the bar and at the base of the rake teeth increase the space between the teeth and the handle and prevent the rake from becoming clogged. The teeth, on account of their cross sectional curvature, are particularly strong, and, as will be noted, the curvature is carried into the edge of the plate so that the teeth are particularly strong at their base. The spacing between the teeth, as well as the merging of the teeth into the plate edge along curved lines and the curvatures in the plate edge, serve to make the rake practically self-cleaning, and any leaves, twigs, etc. that are pierced by the teeth or work their way into the spaces between the teeth almost automatically drop from the rake as soon as the same is lifted. The teeth with their comparatively blunt points do not easily pierce leaves, and if they do pierce the same the leaves do not adhere since the teeth expand quickly from their extreme points into considerable width. When used as a mop, the sewed end of a wet sack may be easily placed over the teeth, becoming firmly anchored in the teeth points without, however, sliding down on the teeth, so that the entire outer face of the tool remains covered and a large area of mopping material is available as the sack is pressed against the ground surface at different angularities of the handle. The length of the metal bar keeps the wooden section of the handle substantially out of reach of the fire, and it will be particularly noted that the construction shown discloses remarkable economy of metal and a clean-cut appearance.

We claim:

1. A tool of the character described, comprising a handle having a slight bend at one end thereof, a plate fastened transversely to the bent end, and integral rake teeth extending from the plate edge and at an angle to the plate, the opposite edge of the plate being sharpened to serve as a weed cutter when the tool is reversed, the teeth being curved in cross section for reenforcing, the curve extending partly into the plate and reenforcing the angle between the teeth and the plate.

2. A tool of the character described, comprising a handle, a flat plate fastened transversely to the handle and having straight rake teeth extending from one edge thereof and at an angle thereto, the rake teeth being formed integral with the plate and being concave in cross-section, and the rake teeth merging into the plate along curved lines, the curved portions of the teeth extending into the plate and reenforcing the angles between the teeth and the plate.

3. A tool comprising a handle having a slight bend at one end, a blade extending at right angles to the bent portion of the handle and being secured thereto, and integral tines extending at an angle to the blade and being curved in cross section, the curved portions extending into the blade for reenforcing the angle between the tines and blade.

4. A tool of the character described comprising a handle, a flat plate fastened transversely to the handle and having straight rake teeth extending from an edge thereof, and at an angle thereto, the rake teeth being formed integral with the plate and being concave in transverse section, the curved portions of the teeth extending into the plate and reinforcing the angle between the teeth and the plate.

EARL T. BARRON.
EDWIN L. GARTHWAITE.